(12) United States Patent
Wakazono

(10) Patent No.: US 7,355,646 B2
(45) Date of Patent: Apr. 8, 2008

(54) DRIVE CONTROL APPARATUS FOR DRIVING MAGNIFICATION-VARYING LENS UNIT TO WIDE-ANGLE END OR TELEPHOTO END WHEN SWITCHING FROM AF MODE TO MF MODE

(75) Inventor: Tsuyoshi Wakazono, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 10/807,629

(22) Filed: Mar. 23, 2004

(65) Prior Publication Data

US 2004/0189858 A1    Sep. 30, 2004

(30) Foreign Application Priority Data

Mar. 27, 2003   (JP)   ............................. 2003-088043
Mar. 27, 2003   (JP)   ............................. 2003-088479

(51) Int. Cl.
   *G03B 13/00*   (2006.01)
   *G03B 17/00*   (2006.01)
   *H04N 5/232*   (2006.01)
   *G02B 15/14*   (2006.01)

(52) U.S. Cl. ......................... 348/345; 396/79; 359/696

(58) Field of Classification Search ................ 348/335, 348/345, 347, 350, 357; 396/77, 79, 85, 396/131, 133, 137, 72, 73, 76, 75; 359/676, 359/694, 696, 823, 697
   See application file for complete search history.

(56) References Cited

U.S. PATENT DOCUMENTS

| | | | | | |
|---|---|---|---|---|---|
| 5,061,954 | A | * | 10/1991 | Toyama et al. | 396/103 |
| 5,075,713 | A | * | 12/1991 | Sakata | 396/80 |
| 5,638,217 | A | * | 6/1997 | Hirasawa et al. | 359/698 |
| 5,802,405 | A | * | 9/1998 | Sugimoto | 396/82 |
| 6,661,585 | B2 | * | 12/2003 | Okawara | 359/697 |
| 6,853,501 | B2 | * | 2/2005 | Mukaiya | 359/698 |

FOREIGN PATENT DOCUMENTS

| | | |
|---|---|---|
| EP | 0 439 219 A2 | 7/1997 |
| JP | S62 43286 | 2/1987 |
| JP | 62-247316 | 10/1987 |
| JP | 05014793 A   * | 1/1993 |
| JP | 5-45554 | 2/1993 |
| JP | 5-236330 | 9/1993 |
| JP | 2561637 | 10/1997 |
| JP | 10-206718 | 8/1998 |

OTHER PUBLICATIONS

European Search Report (Jun. 4, 2004).

* cited by examiner

*Primary Examiner*—Justin P Misleh
(74) *Attorney, Agent, or Firm*—Morgan & Finnegan LLP

(57) ABSTRACT

A drive control apparatus has a controller which operates in a first mode carrying out auto focusing control and a second mode not carrying out auto focusing control and carries out control so as to drive forcibly a magnification-varying lens unit to a wide-angle end or telephoto end when switching from the first mode to the second mode.

6 Claims, 7 Drawing Sheets

DRIVE CONTROL APPARATUS FOR DRIVING MAGNIFICATION-VARYING LENS UNIT TO WIDE-ANGLE END OR TELEPHOTO END WHEN SWITCHING FROM AF MODE TO MF MODE

BACKGROUND OF THE INVENTION

1. Field of the Invention

The present invention relates to an apparatus which controls driving of an optical apparatus such as a zoom lens apparatus used for a TV camera and video camera.

2. Description of the Related Art

In a front-focus system in which a focus lens unit is placed closer to an object side than a magnification-varying lens unit, an amount of movement of a lens barrel does not change when magnification is varied, and therefore the front-focus system is advantageous for a manual focusing system. Thus, the front-focus system is widely used for broadcasting zoom lenses in which primary importance is attached to manual operation and for commercial use zoom lenses.

On the other hand, a rear-focus system in which a focus lens unit is placed closer to an image side (image-taking apparatus side) than a magnification-varying lens unit is advantageous in reducing the size and weight of the focus lens unit, and therefore the rear-focus system is widely used for a zoom lens apparatus with an auto focusing system.

With increasing diversification of camerapersons and image-taking conditions of a zoom lens apparatus for a TV camera in recent years, there is a demand for enhanced operability and maneuverability, and therefore there is a rising demand for equipment provided with both manual focusing (hereinafter referred to as "MF") and auto focusing (hereinafter referred to as "AF").

Furthermore, the zoom lens apparatus proposed in Japanese Patent No. 2561637 and Japanese Utility Model Publication No. S62(1987)-43286 uses a lens unit for AF placed closer to an image side than a magnification-varying lens unit and uses a lens unit for MF placed closer to an object side than the magnification-varying lens unit, thus providing an AF/MF switchable zoom lens.

The above described AF/MF switchable zoom lens is constructed of, in order from the object side, a first focus lens unit for manual focusing, a magnification-varying lens unit which moves on the optical axis to vary magnification, a correction lens unit for correcting the image plane which varies due to the change of magnification and a relay lens unit which contributes to image formation on an image-pickup device such as a CCD sensor or a C-MOS sensor. Furthermore, a second focus lens unit for auto focusing is placed in the relay lens unit.

During an MF mode operation, the second focus lens unit is fixed at a predetermined position and focusing is carried out by manually operating the first focus lens unit.

Then, when the MF mode is switched to the AF mode, the first focus lens unit is fixed at the position where the switching is performed and auto focusing is carried out by driving the second focus lens unit by a motor. Then, when the AF mode is switched to the MF mode, the second focus lens unit is automatically returned to the abovedescribed predetermined position and fixed in conjunction with the switching.

However, when the AF mode is switched to the MF mode, if, for example, the first focus lens unit is fixed at infinity, while the second focus lens unit which has been under AF control on the object at a finite distance is automatically returned to a predetermined position other than infinity, defocusing occurs.

This defocusing can be generally solved by operating the first focus lens unit in such a way that an in-focus position is manually found on the telephoto side. However, when an image is taken on the wide-angle side, if the AF mode is switched to the MF mode, the cameraperson must carry out a zooming operation up to the telephoto side first and then manually carry out focusing operation.

SUMMARY OF THE INVENTION

It is an object of the present invention to provide a drive control apparatus for an optical apparatus capable of making defocusing when switching from an AF mode to MF mode unnoticeable.

Furthermore, it is another object of the present invention to provide a drive control apparatus for an optical apparatus, even if defocusing occurs when the AF mode is switched to the MF mode, capable of quickly correcting the defocusing.

In order to attain the above described objects, one aspect of the present invention is a drive control apparatus for an optical apparatus including a first focus lens unit, which is manually operated a second focus lens unit which is driven under auto focusing control and a magnification-varying lens unit, and includes the following: The drive control apparatus is provided with a focus motor which drives the second focus lens unit, a zoom motor which drives the magnification-varying lens unit and a controller. The controller controls driving of the magnification-varying lens unit through the zoom motor and operates in a first mode carrying out the auto focusing control through the focus motor and in a second mode not carrying out the auto focusing control. When switching from the first mode to the second mode, the controller carries out control so as to drive the second focus lens unit to a first predetermined position. Furthermore, when switching from the first mode to the second mode, the controller carries out control so as to drive the magnification-varying lens unit to a second predetermined position.

The features of the drive control apparatus and optical apparatus of the invention will become more apparent from the following detailed description of a preferred embodiment of the invention with reference to the drawings.

DETAILED DESCRIPTION OF THE PREFERRED EMBODIMENTS

With reference now to the attached drawings, embodiments of the present invention will be explained below.

Embodiment 1

Figure 1:
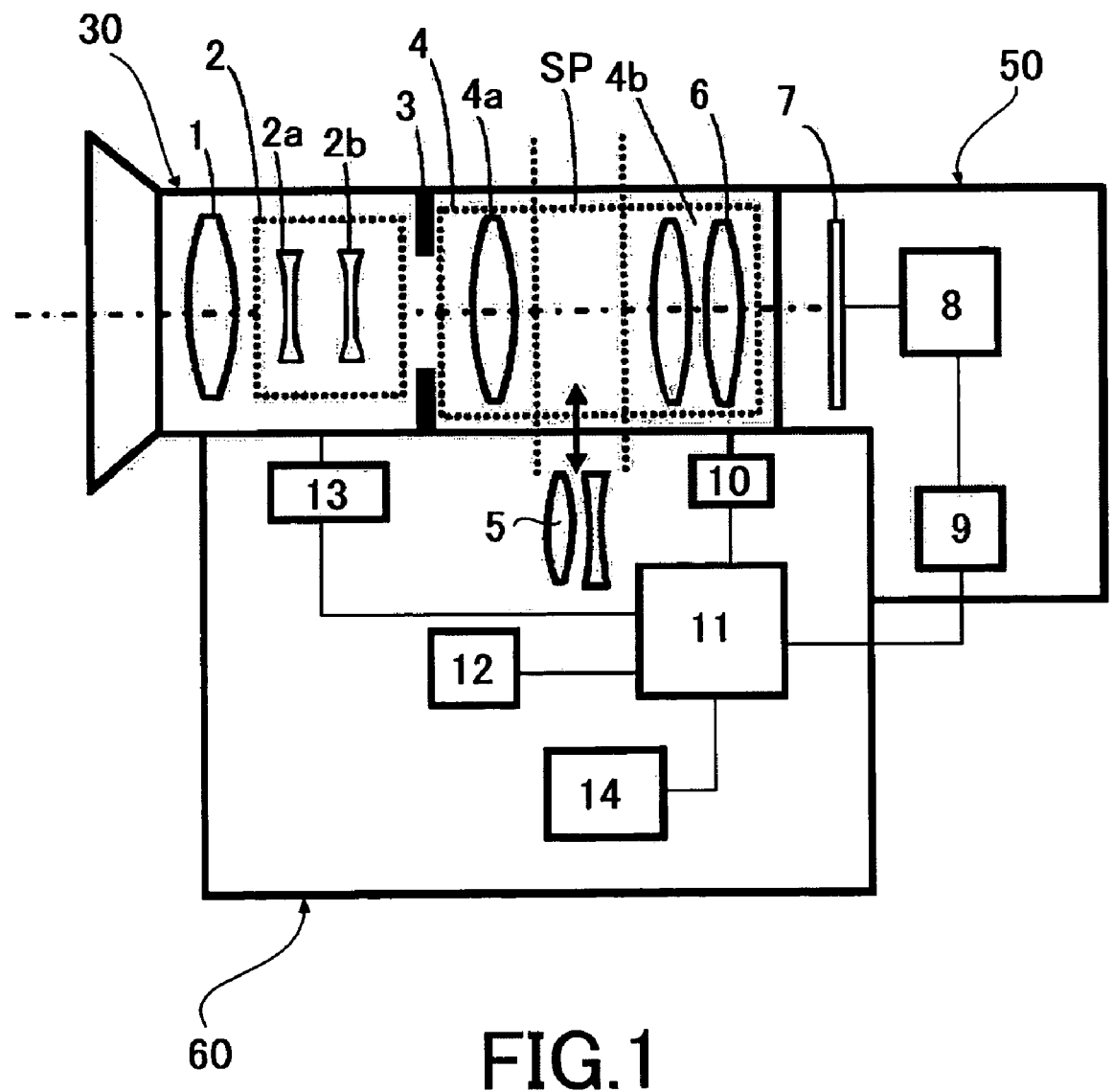
FIG. 1 is a block diagram showing a structure of an image-taking system according to Embodiment 1 of the present invention.

FIG. 1 is a schematic view of the structure of an image-taking system which is Embodiment 1 of the present invention consisting of a zoom lens apparatus 30, a camera 50 in which the zoom lens apparatus 30 is mounted and a drive unit 60 which is mounted in the zoom lens apparatus 30.

In the zoom lens apparatus 30, in order from an object side, reference numeral 1 denotes a first focus lens unit for focusing by manual operation, 2 denotes a zoom lens unit which comprises a magnification-varying lens unit 2a which moves on the optical axis to change magnification and a correction lens unit 2b for correcting a variation of an image plane due to the change of magnification, 3 denotes a stop unit for adjusting light quantity and 4 denotes a relay lens unit which contributes to image formation.

Furthermore, the zoom lens apparatus 30 is provided with a space SP into/from which an extender lens 5 having a function of changing the focal length range of the overall zoom lens system can be inserted/removed. The relay lens unit 4 is constructed of a front relay lens unit 4a which located closer to the object side than the space SP (extender lens 5) and a rear relay lens unit 4b which located closer to the image plane side (camera side) than the space SP.

Reference numeral 6 denotes a second focus lens unit which is driven to carry out AF. The second focus lens unit 6 is placed in the rear relay lens unit 4b. Then, the first and second focus lens units 1 and 6, magnification-varying lens unit 2, stop unit 3 and relay lens unit 4 (and extender lens 5) constitute a zoom lens optical system.

Furthermore, in the camera 50, reference numeral 7 denotes an image-pickup device such as a CCD sensor or C-MOS sensor which photoelectrically converts an object image formed by the zoom lens apparatus 30 and outputs an electric signal. Reference numeral 8 denotes an image signal processing circuit, which converts the electric signal from the image-pickup device 7 to an image signal.

Reference numeral 9 denotes an AF evaluation unit which generates an AF evaluation value signal indicating the sharpness (contrast state) of the object image based on the image signal processed by the image signal processing circuit 8.

In the drive unit 60, reference numeral 10 denotes a focus motor which drives the second focus lens unit 6 and 11 denotes a CPU as a controller. Reference numeral 12 denotes a memory, which stores a first predetermined position of the second focus lens unit 6, which will be described later, and data, etc., necessary for AF control.

A stepping motor or a DC motor may be used as the focus motor 10. In a case where the stepping motor is used, an initial position is set by a reset switch and the position of the second focus lens unit 6 is controlled by counting pulses of the stepping motor from the initial position. In a case where the DC motor is used, the position of the second focus lens unit 6 is controlled by detecting the position of the second focus lens unit 6 by an encoder.

Reference numeral 13 denotes a zoom motor for driving the zoom lens unit 2. Though not shown, the zoom motor 13 actually drives a cam ring and two types of cam formed in the cam ring drive the magnification-varying lens unit 2a and correction lens unit 2b in such a way as to describe different loci (see FIG. 4). Reference numeral 14 denotes a mode changeover switch which switches between an AF mode and MF mode. The CPU 11 always monitors whether the mode changeover switch 14 is set to the AF mode side or the MF mode side.

A stepping motor or a DC motor with an encoder may be used as the zoom motor 13.

Figure 2:
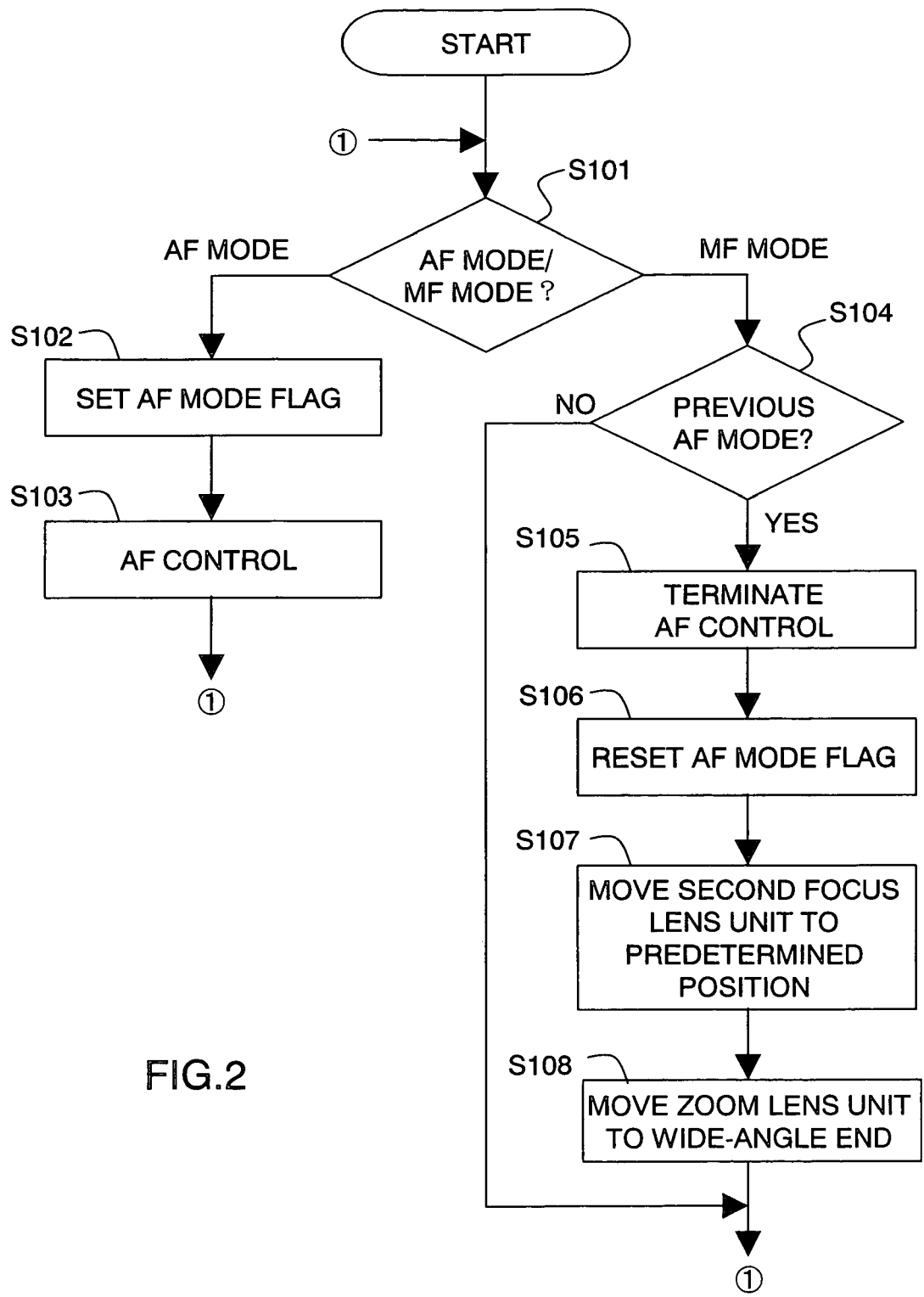
FIG. 2 is a flow chart showing MF/AF mode switching processing according to Embodiment 1.

Then, using the flow chart in FIG. 2 and FIG. 3 to FIG. 5, the operation of the CPU 11 will be explained. In FIG. 2, the CPU 11 judges whether the setting of the mode changeover switch 14 is the AF mode or MF mode (step (abbreviated as "S" in the figure) 101), and if the setting is the AF mode, the process progresses to step 102 and an AF mode flag which indicates that this routine is the AF mode is set.

Then, the CPU 11 causes the AF evaluation unit 9 to start to generate an AF evaluation value signal. Then, the CPU 11 controls the focus motor 10 so as to move to a position at which the AF evaluation value signal input reaches a maximum level and drives the second focus lens unit 6 to an in-focus position (S103). In this way, AF control which is called a "contrast detection method" or "TV-AF system" or "climbing system" is carried out.

Figure 3:
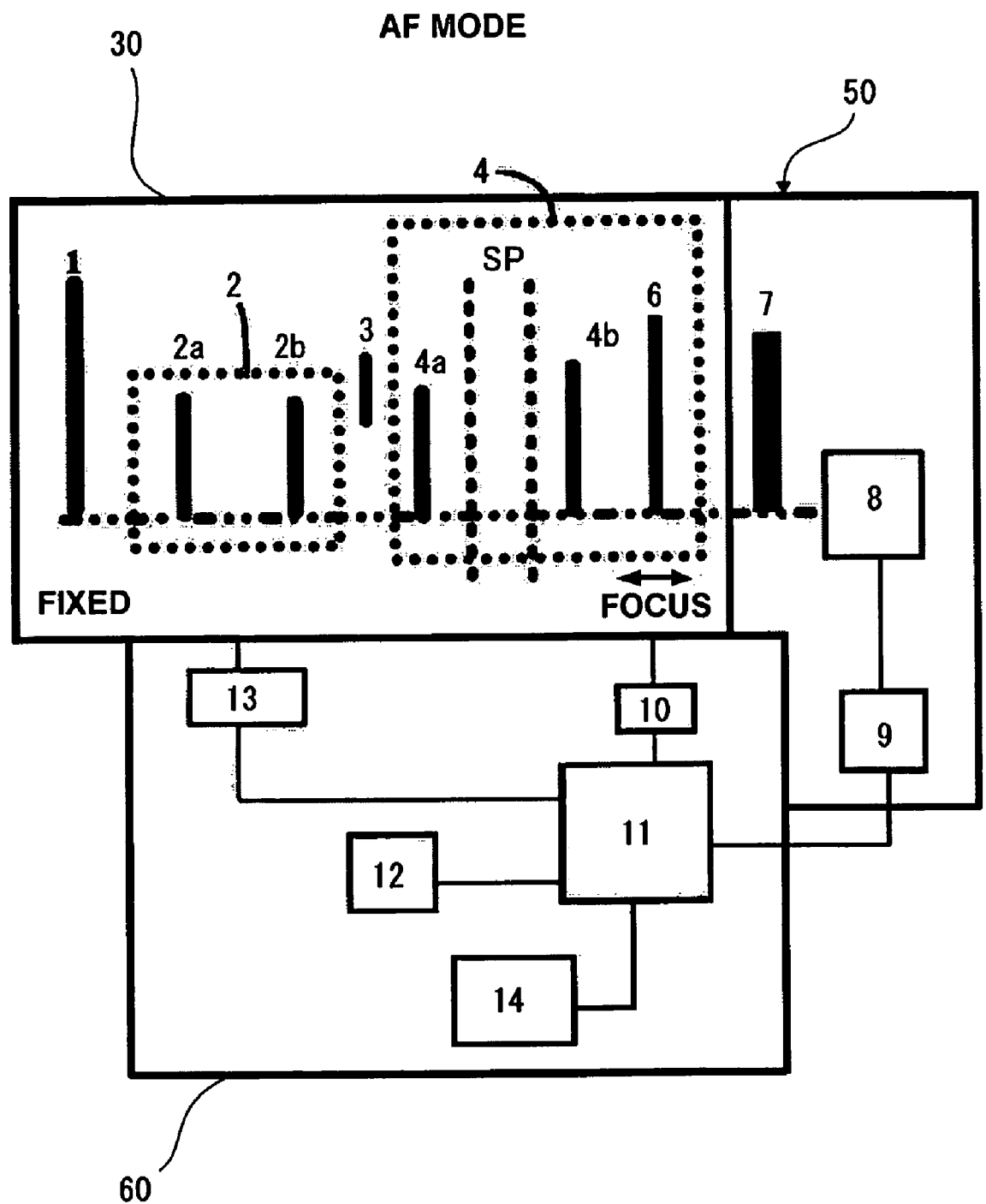
FIG. 3 illustrates a state of a zoom lens apparatus in an AF mode according to Embodiment 1.

FIG. 3 shows a situation of the zoom lens apparatus when carrying out AF control (however, the extender lens unit 5 is omitted). At this time, the first focus lens unit 1 remains immobile unless a cameraperson manually operates the first focus lens unit 1. Then, the process returns to step 101.

On the other hand, in step 101, when the setting of the mode changeover switch 14 is judged to be the MF mode, the process progresses to step 104 where it is judged whether the previous routine has been in the AF mode or not. This judgement is made by checking whether the aforementioned AF mode flag is set or not.

Figure 5:
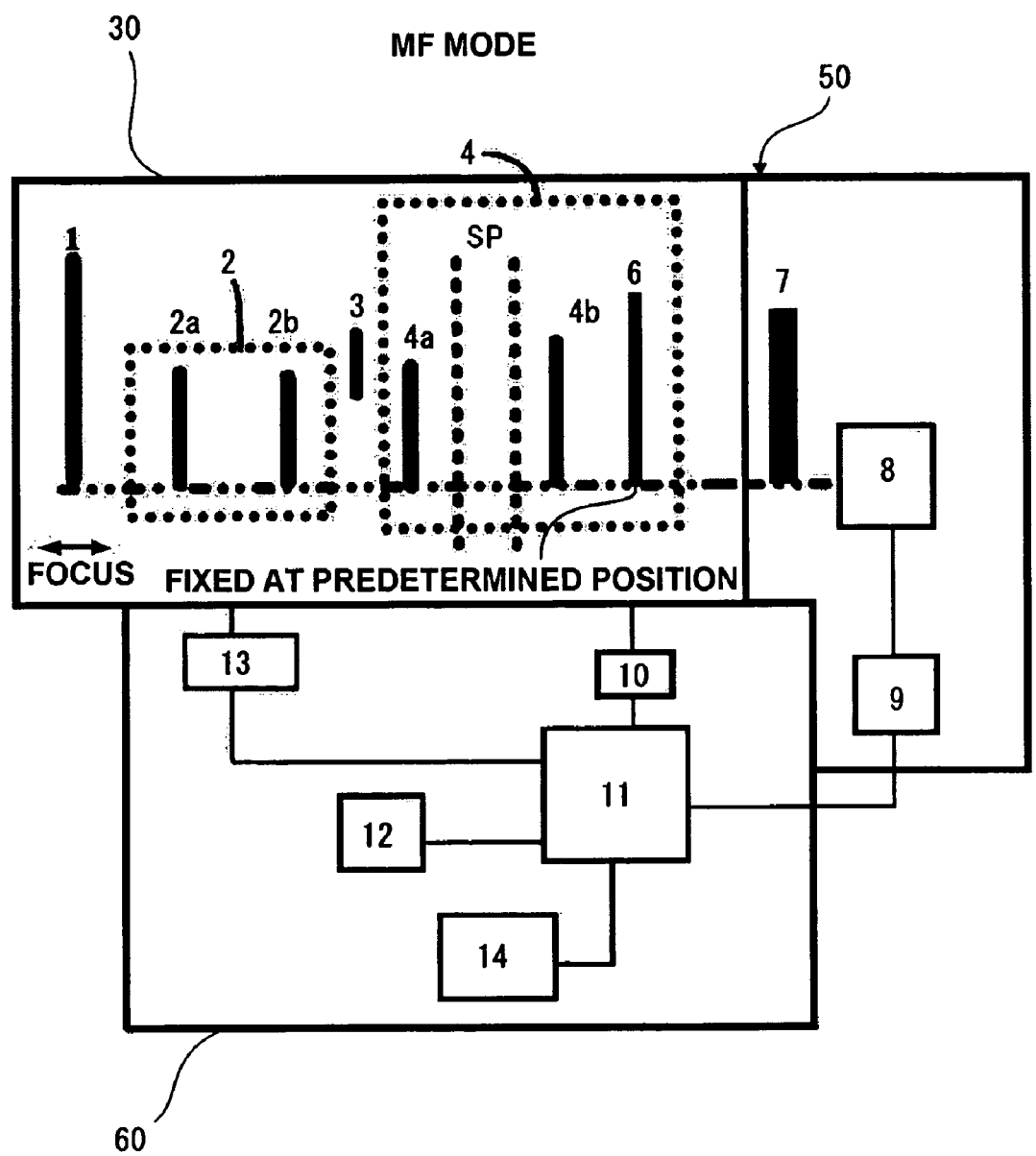
FIG. 5 illustrates a state of the zoom lens apparatus in the MF mode according to Embodiment 1.

When it is judged that the previous routine has not been in the AF mode (that is, MF mode), the process returns to step 101. FIG. 5 shows the situation of the zoom lens apparatus 60 in the MF mode.

On the other hand, when it is judged in step 104 that the previous routine has been in the AF mode (that is, immediately after the AF mode is switched to the MF mode), the process progresses to step 105 and terminates the AF control first. Then, in step 106, the CPU 11 resets the AF mode flag.

Then, the process progresses to step 107, the CPU 11 controls the focus motor 10 such that the second focus lens unit 6 is driven under the AF control to the first predetermined position stored beforehand in the memory 12. The first predetermined position is the infinite position of the second focus lens unit 6 when a zoom position is the wide-angle end or an in-focus position on the infinite side of the second focus lens unit 6 when a zoom position is the wide-angle end. The first predetermined position information is stored in the memory 12. Further, the first predetermined position may be set to a flange-focal distance adjustment position of the second focus lens unit 6. The flange-focal distance adjustment position is an adjustment position of the second focus lens unit 6 where an in-focus state with respect to an optical object is obtained when a zoom state is a wide-angle state. The adjustment position information may be stored as the first predetermined position in the memory 12. Thereafter, the second focus lens unit 6 becomes immobile at the first predetermined position.

Figure 4:
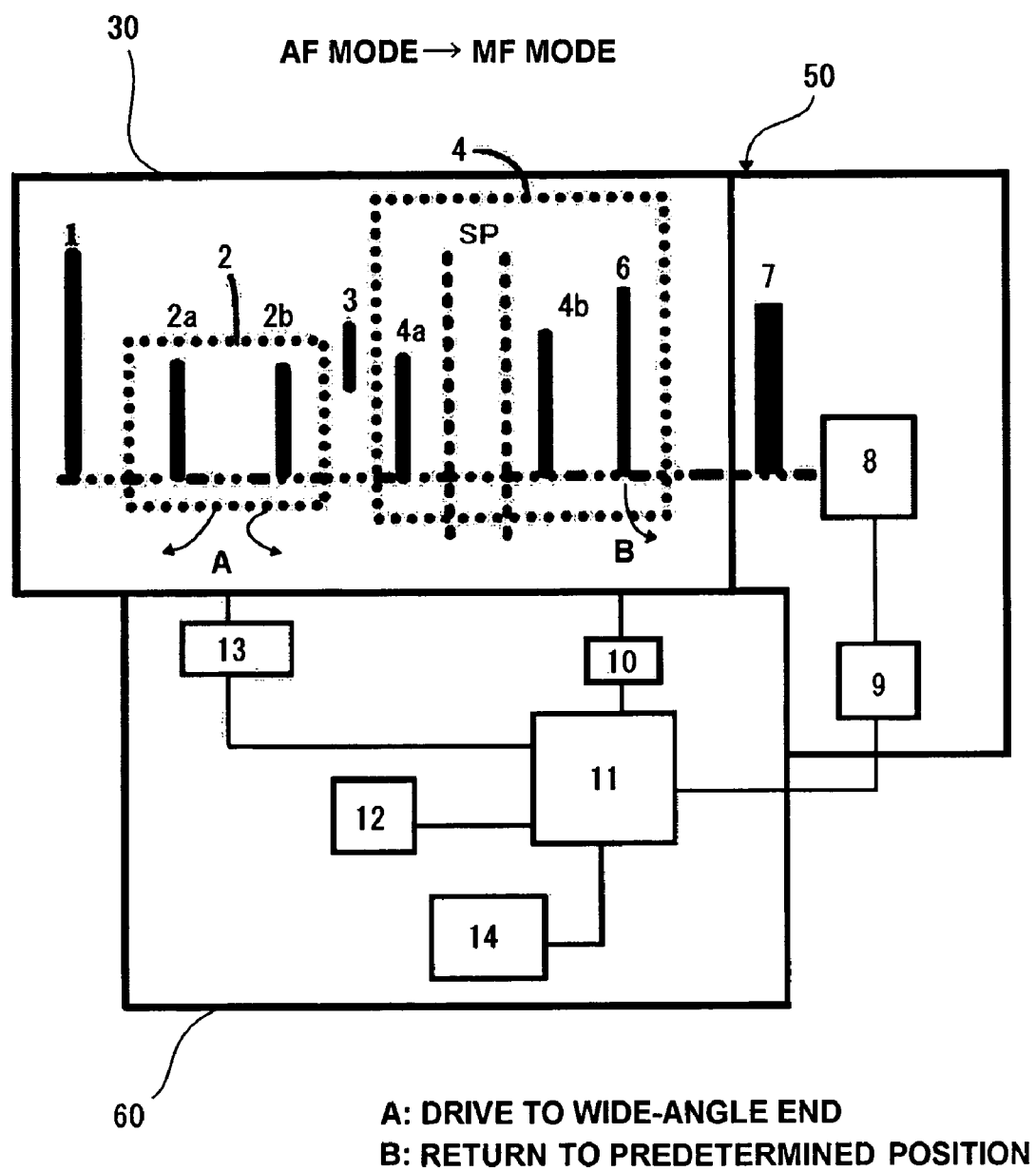
FIG. 4 illustrates a switching operation from an AF mode to an MF mode according to Embodiment 1.

Furthermore, in next step 108, the CPU 11 controls the zoom motor 13 to drive the zoom lens unit 2 to the wide-angle end as a second predetermined position. FIG. 4 shows the operation by the processing in the above described steps 105 to 108. Thereafter, as shown in FIG. 5, manual focusing operation will be carried out in the MF mode by the cameraperson.

As shown above, according to this embodiment, when the AF mode is switched to the MF mode, the second focus lens unit 6 which has been driven under the AF control is automatically driven to the first predetermined position and the zoom lens unit 2 is automatically driven to the wide-angle end. Therefore, even if defocusing is occurred by switching the AF mode to the MF mode, that is, by a movement of the second focus lens unit 6 to the first predetermined position from an in-focus position, before the first focus lens unit 1 is manually operated, it is possible to make the defocusing unnoticeable. Therefore, even if the AF mode is switched to the MF mode during image taking, it is possible to maintain the sharpness of the image taken to a certain degree.

Embodiment 2

Figure 6:
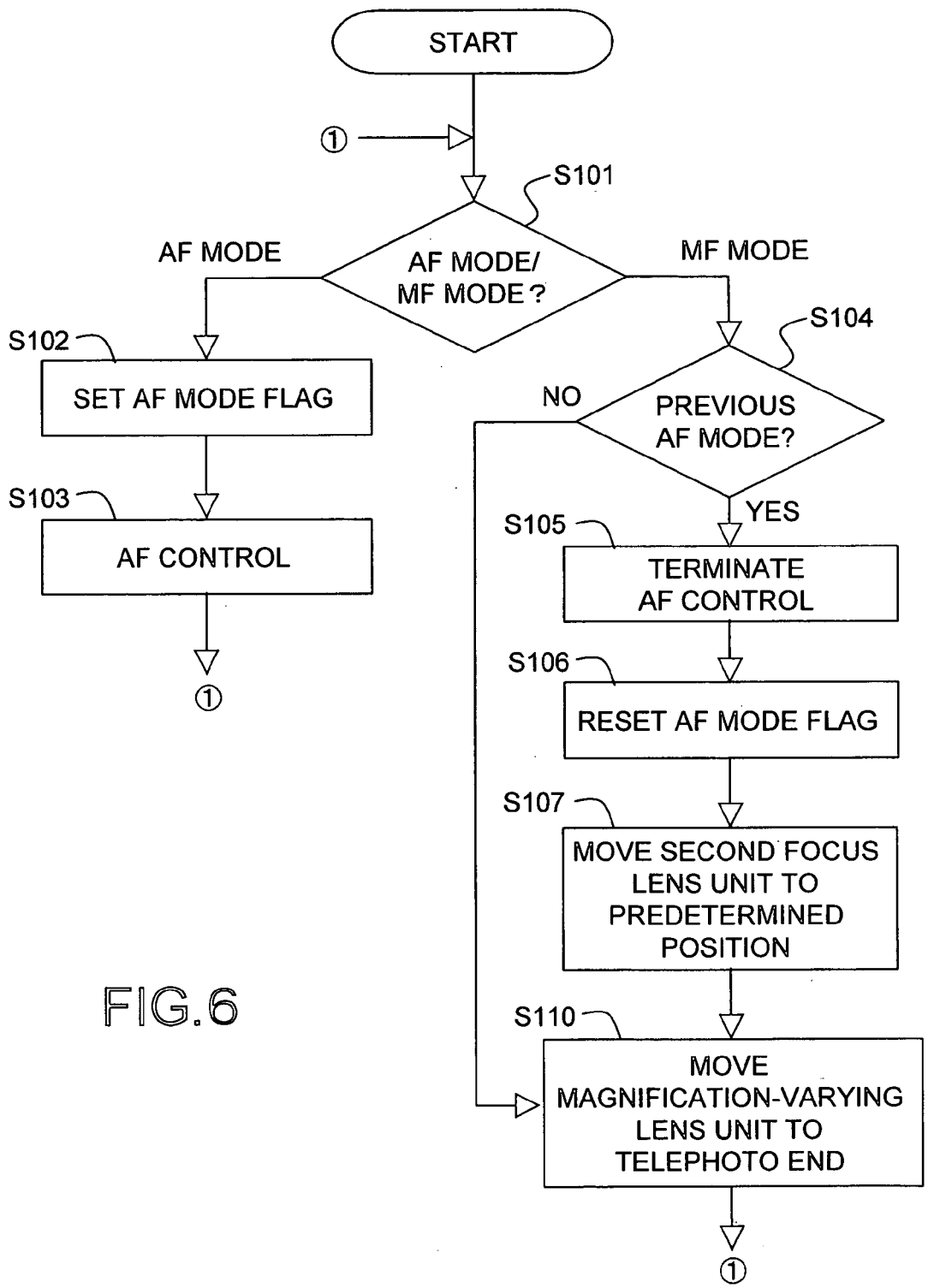
FIG. 6 is a flow chart showing MF/AF mode switching processing according to Embodiment 2 of the present invention.

FIG. 6 is a flow chart showing the operation of the CPU in a drive unit constituting an image-taking system according to a second embodiment of the present invention.

The structures of a zoom lens apparatus, camera and drive unit constituting an image-taking system according to this embodiment are the same as those in Embodiment 1 and the respective components will be explained with the same reference numerals as those in Embodiment 1 (FIG. 1) assigned.

In FIG. 6, steps 101 to 107 are the same as steps 101 to 107 explained in Embodiment 1 (FIG. 2), and therefore detailed explanations will be omitted.

In step 101, when the CPU 11 judges that the mode changeover switch 14 is set to the MF mode, and in step 102, the CPU 11 judges that the previous routine has been set to the AF mode, then the CPU 11 terminates the AF control (step 105), resets the AF mode flag (step 106) and drives the second focus lens unit 6 to the predetermined position (step 107). In step 110, the CPU 11 controls the zoom motor 13 to drive the zoom lens unit 2 to the telephoto end which is a second predetermined position.

Figure 7:
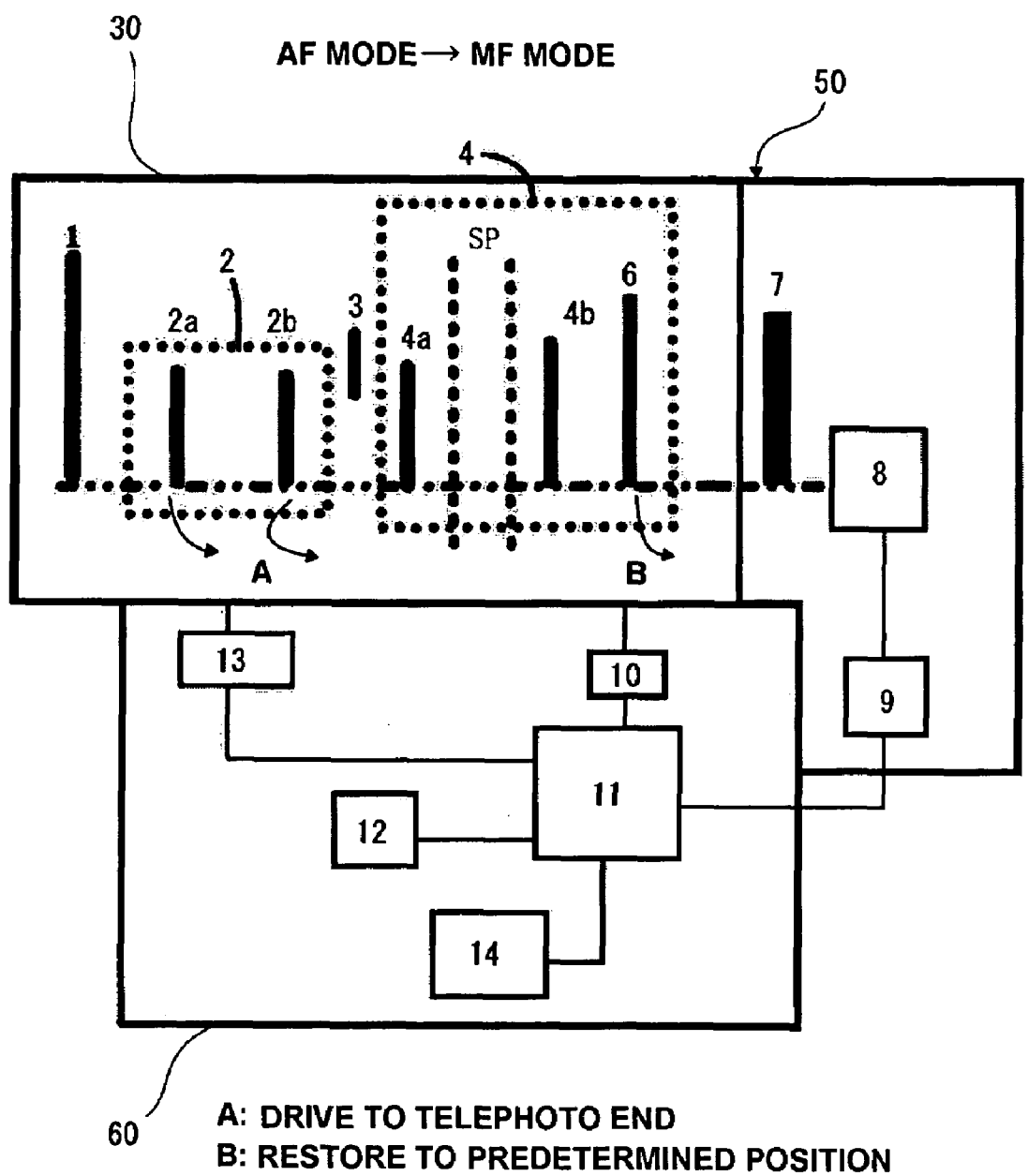
FIG. 7 illustrates the switching processing from the AF mode to the MF mode according to Embodiment 2.

FIG. 7 shows the operation corresponding to the processing in above described steps 105 to 107 and 110. Hereinafter, as shown in FIG. 5, the manual focusing operation in the MF mode will be carried out by the cameraperson.

As shown above, in this Embodiment, when the AF mode is switched to the MF mode, the second focus lens unit 6 which has been driven under the AF control is automatically driven to the first predetermined position and the zoom lens unit 2 is automatically driven to the telephoto end. The first predetermined position is the infinite position of the second focus lens unit 6 when a zoom position is the wide-angle end or an in-focus position on the infinite side of the second focus lens unit 6 as Embodiment 1. The first predetermined position information is stored in the memory 12. Therefore, by switching the AF mode to the MF mode, that is, by a movement of the second focus lens unit 6 to the first predetermined position from an in-focus position, before the first focus lens unit 1 is manually operated, even if defocusing is occurred, the cameraperson need not operate zooming up to the telephoto end to correct this defocusing each time. Therefore, it is possible for the cameraperson to immediately correct the defocusing produced by automatically moving the second focus lens unit 6 to the first predetermined position and smoothly change to the manual focusing state.

The foregoing embodiments have described the case where the zoom lens unit 2 is constructed of the magnification-varying lens unit 2a and the correction lens unit 2b, but the present invention is also applicable to a case where a zoom lens unit having a different structure is provided. Furthermore, the foregoing embodiments include the insertion space SP of the extender lens unit 5, but the present invention is also applicable to a case where the extender lens unit 5 is not mounted (the insertion space SP is not provided).

Furthermore, the foregoing embodiments have described the case where the second focus lens unit 6 is placed in the rear relay lens unit 4b, but the second focus lens unit 6 can also be placed in the front relay lens unit 4a.

Furthermore, the foregoing embodiments have described the case where the zoom lens apparatus is provided with the drive unit, that is, a compact type zoom lens apparatus, but the present invention is also applicable to a so-called large zoom lens apparatus which incorporates the structure of the drive unit in the zoom lens apparatus as an integral part. Furthermore, the present invention is also applicable to a video camera which integrates the zoom lens apparatus, drive unit and camera as one body.

Furthermore, as described in the foregoing embodiments, switching between the AF mode and the MF mode can be performed by the cameraperson through the operation of the mode changeover switch 14 or by a remote operation signal from a place different from the place of the cameraperson.

Furthermore, the foregoing embodiments have described the case where when the AF mode is switched to the MF mode, the zoom lens unit 2 is moved to the wide-angle end or telephoto end, but the position to which the zoom lens unit 2 is moved need not be these end positions and can also be a position closer to the wide-angle side or telephoto side than the intermediate position of the focal length of the zoom lens apparatus.

What is claimed is:

1. A drive control apparatus for an optical apparatus including a first focus lens unit which is manually operated, a second focus lens unit which is driven under auto focusing control and a magnification-varying lens unit, the drive control apparatus comprising:

a focus motor which drives the second focus lens unit;

a zoom motor which drives the magnification-varying lens unit; and a controller which controls driving of the magnification-varying lens unit through the zoom motor and operates in a first mode carrying out the auto focusing control through the focus motor and in a second mode not carrying out the auto focusing control, wherein, when switching from the first mode to the second mode, the controller carries out control so as to drive forcibly the magnification-varying lens unit to a wide-angle end, and wherein, in a state that the magnification-varying lens unit is driven to the wide-angle end, the first focus lens unit is manually operated to allow focusing control.

2. The drive control apparatus according to claim 1, wherein the controller carries out the auto focusing control based on an AF evaluation value signal which indicates a contrast state of an object image and is generated from an image signal obtained through image taking with the optical apparatus.

3. An optical apparatus comprising the drive control apparatus according to claim 1.

4. A drive control apparatus for an optical apparatus including a first focus lens unit which is manually operated, a second focus lens unit which is driven under auto focusing control and a magnification-varying lens unit, the drive control apparatus comprising:

a focus motor which drives the second focus lens unit:

a zoom motor which drives the magnification-varying lens unit; and a controller which controls driving of the magnification-varying lens unit through the zoom motor and operates in a first mode carrying out the auto focusing control through the focus motor and in a second mode not carrying out the auto focusing control, wherein, when switching from the first mode to the second mode, the controller carries out control so as to drive forcibly the magnification-varying lens unit to a telephoto end, and wherein, in a state that the magnification-varying lens unit is driven to the telephoto end, the first focus lens unit is manually operated to allow manual focusing control.

5. The drive control apparatus according to claim 4, wherein the controller carries out the auto focusing control based on an AF evaluation value signal which indicates a contrast state of an object image and is generated from an image signal obtained through image taking with the optical apparatus.

6. An optical apparatus comprising the drive control apparatus according to claim 4.

* * * * *